United States Patent
Rambaud (10) Patent No.: US 7,519,100 B2
(45) Date of Patent: Apr. 14, 2009

(54) METHOD AND DEVICE FOR TRANSMISSION/RECEPTION WITH FREQUENCY HOPPING

(75) Inventor: Luc Rambaud, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1470 days.

(21) Appl. No.: 10/116,100

(22) Filed: Apr. 5, 2002

(65) Prior Publication Data

US 2002/0146061 A1  Oct. 10, 2002

(30) Foreign Application Priority Data

Apr. 10, 2001  (FR) .................................... 01 05153

(51) Int. Cl.
*H04B 1/00* (2006.01)
(52) U.S. Cl. .................. 375/133; 375/132; 324/85; 455/20; 455/118; 455/130; 455/131; 455/190.1; 455/311; 455/313; 455/323
(58) Field of Classification Search ................ 375/132, 375/133, 134, 140, 141, 130, 145, 265; 370/326, 370/321, 468, 482
See application file for complete search history.

(56) References Cited

U.S. PATENT DOCUMENTS

| 5,528,623 | A |   | 6/1996  | Foster, Jr. |
|-----------|---|---|---------|-------------|
| 6,005,477 | A | * | 12/1999 | Deck et al. .................. 370/482 |
| 6,130,905 | A | * | 10/2000 | Wakayama .................. 375/132 |
| 6,172,927 | B1| * | 1/2001  | Taylor ........................ 365/219 |

FOREIGN PATENT DOCUMENTS

| EP | 0 785 637   | 7/1997  |
|----|-------------|---------|
| WO | WO 96/35265 | 11/1996 |

* cited by examiner

*Primary Examiner*—David C Payne
*Assistant Examiner*—Adolf Dsouza
(74) *Attorney, Agent, or Firm*—Oblon, Spivak, McClelland, Maier & Neustadt, P.C.

(57) ABSTRACT

A method and device for transmitting data in the form of a series of blocks in which each block of data is subjected to a frequency conversion in order to be transmitted at a carrier frequency. The method includes inserting a sequence of padding data between a first block of data intended to be transmitted at a first carrier frequency and a second block of data intended to be transmitted at a second carrier frequency, and transmitting the padding data while the frequency changes from the first carrier frequency to the second carrier frequency.

20 Claims, 8 Drawing Sheets

METHOD AND DEVICE FOR
TRANSMISSION/RECEPTION WITH
FREQUENCY HOPPING

CROSS REFERENCE TO RELATED APPLICATIONS

This application is based upon and claims priority under 35 U.S.C. §119 from French Patent Application No. 0105153, filed Apr. 10, 2001.

BACKGROUND OF THE INVENTION

Summary of the Invention

The present invention concerns in general terms a method and device for transmission with frequency hopping and a corresponding reception method and device. The present invention applies more particularly to transceivers in telecommunication systems with frequency hopping.

The Bluetooth telecommunication system is a low-cost universal radio interface intended to replace cable or infrared links between different computer or electronic appliances. This system operates in a frequency band around 2.4 GHz and uses modulation by frequency hopping. More precisely, when there is a connection between two Bluetooth entities, the data are transmitted in the form of blocks, the data in one block being transmitted at a radio frequency fixed for the entire period of transmission of the said block, the radio frequencies following each other according to a pseudo-random scheme.

Moreover, the multiplicity of mobile telephony standards, GSM, EDGE, UMTS, to cite only a few, has given rise to the need for a universal programmable radio platform (Software Defined Radio), capable of being configured on request for such and such a type of system. Typically, such a platform consists of a microprocessor or DSP processor, FPGA (Field Programmable Gate Array) programmable circuits, ASIC circuits having high configuration flexibility, and A/D and D/A converters. It is divided into a digital part and an analogue part. The digital part is generally responsible, on transmission, for the modulation and the translation from base band frequency or from the intermediate frequency to a radio frequency (RF) and the reverse operation on reception. The analogue part is essentially responsible, on transmission, for the digital to analogue conversion and, conversely, on reception, for the analogue to digital conversion. Designing a system with frequency hopping by means of a radio platform is tricky since the frequency synthesis circuit (DDS or Direct Digital Synthesizer), responsible for the generation of radio frequency RF, does not make it possible to pass instantaneously from one RF value to another. A certain amount of stabilisation time must in fact be complied with. In addition, the presence of interpolating filters on transmission and decimators on reception, whose characteristics depend on the frequencies used, makes it difficult to programme a frequency transition on a clearly determined data item.

The problem at the basis of the invention is to propose a radio platform for implementing a universal transmission/reception system with frequency hopping which does not have the aforementioned drawbacks.

The problem is resolved by the invention, defined as a method of transmitting data in the form of a series of blocks, each block of data being subjected to a frequency conversion in order to be transmitted at a carrier frequency, at which there is inserted, between a first block of data intended to be transmitted at a first carrier frequency and a second block of data intended to be transmitted at a second carrier frequency, a sequence of padding data, the frequency conversion passing from a conversion to the first frequency to a conversion to the second carrier frequency when the said frequency conversion operates on the said padding data.

According to a first variant, the padding data are inserted in the form of a padding block between the said first and second blocks.

According to a second variant, the padding data are concatenated, as a suffix, with the first padding block.

According to a third variant, the padding data are concatenated, as a prefix, with the second padding block.

The method can comprise a first process of writing in a buffer of the FIFO type and a second process of reading this buffer, the first and second processes operating asynchronously. The first process writes a block of data when a flag indicates that the buffer is almost empty, and then changes the value of the flag and recommences. The second process, for its part, reads a data item in the buffer, removes the said flag if the buffer is almost empty, and then recommences.

According to the first variant, a block of padding data is written in the buffer if the following block must be transmitted at a carrier frequency different from the current carrier frequency.

According to the second variant, a padding suffix is concatenated with the block preceding the first block which is to be transmitted at a carrier frequency different from the current carrier frequency and the block thus concatenated is written in the buffer.

According to the third variant, a padding prefix is concatenated with a block of data if this is to be transmitted at a carrier frequency different from the current carrier frequency.

The invention is also defined by a transmission device adapted to transmit data in the form of a series of blocks and comprising means for implementing the method disclosed above.

It advantageously comprises a buffer of the FIFO type adapted to receive blocks of data to be transmitted, a frequency converter adapted to transpose the data read in the said buffer to a carrier frequency, a frequency synthesiser supplying a clock of the carrier frequency to the said converter, means of inserting padding data, and a control device adapted to instruct the said insertion means to insert padding data between two blocks of data to be transmitted and to instruct the frequency synthesiser to effect a change in carrier frequency.

The invention is also defined by a method of receiving data sent by a transmission device with frequency hopping in the form of a series of blocks, each block having been transmitted at a carrier frequency which has been converted into base band by means of a frequency conversion, a first block of data, referred to as useful data, transmitted at a first carrier frequency, being separated from a second block of useful data, transmitted at a second carrier frequency, by a sequence of padding data, the frequency conversion passing from a conversion using the first carrier frequency to a conversion using the second carrier frequency when the said frequency conversion operates on the said padding data.

If a transition is detected between useful data and padding data, the frequency conversion passes from a conversion using the first carrier frequency to a conversion using the second carrier frequency when this transition is detected.

Advantageously, the method comprises a first process of writing in a buffer of the FIFO type and a second process of reading this buffer, the first and second processes operating asynchronously. The first process removes the flag when the buffer is almost full, and then recommences. The second process for its part reads a block of data when the said flag indicates that the buffer is almost full, changes the value of the flag, and then recommences.

The second process determines the start of the second useful block after having detected a transition between useful data and padding data and updates, at each following reading, the length of the current useful block remaining to be read.

Finally, the invention concerns a reception device adapted to receive data transmitted by a frequency hopping transmission device and in the form of blocks of useful data, interspersed or not with sequences of padding data, the said device comprising means for implementing the method as disclosed above.

Advantageously, the device comprises a buffer of the FIFO type adapted to receive the said data, a frequency converter operating at a working frequency and adapted to convert the data read from the said buffer into a signal in base band, a frequency synthesiser supplying to the said frequency converter a signal at the said working frequency, means adapted to detect a transition between useful data and padding data and a control device adapted to instruct the said frequency synthesiser to effect a change of working frequency when such a transition is detected.

BRIEF DESCRIPTION OF THE DRAWINGS

The characteristics of the invention mentioned above, as well as others, will emerge more clearly from a reading of the description given in relation to the accompanying drawings, amongst which.

DETAILED DESCRIPTION OF THE INVENTION

Figure 1:
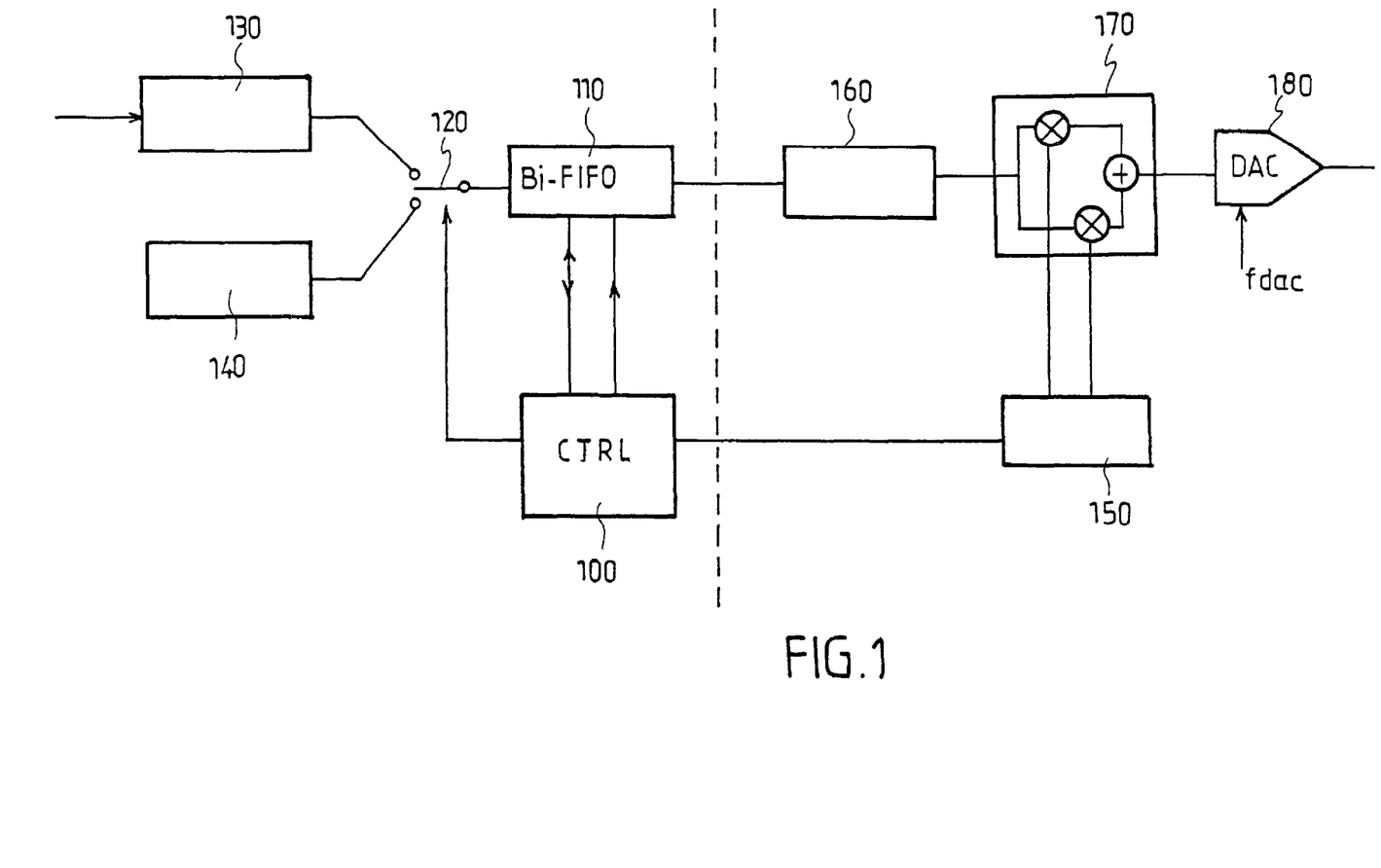
FIG. 1 depicts schematically a radio platform using a frequency hopping transmission device according to one embodiment of the invention.

The system illustrated in FIG. 1 illustrates schematically the implementation of a frequency hopping transmitter, for example a Bluetooth transmitter, by means of a radio platform. This platform is divided into two independent modules working asynchronously, as indicated by the broken line. The left-hand module is entirely digital and is responsible for the conversion of bits to symbols. The right-hand module, referred to as the restoration module, for its part provides the frequency translation to the carrier frequency.

The digital module comprises a modulator 130 converting NRZ coded data to be transmitted into complex symbols (I,Q). Advantageously, the modulator 130 will be a GFSK (Gaussian Frequency Shift Keying) modulator in the case of a Bluetooth transmitter. The complex symbols supplied by the modulator 130 will hereinafter be referred to as "useful data". These are stored in the form of blocks of predetermined length in a buffer 110 using a bi-FIFO memory. It should be stated that a bi-FIFO memory is a memory of the FIFO (First In First Out) type with a double port for access in read and write mode. The buffer is filled by the writing of useful data issuing from the digital module and is emptied at the time of reading by the restoration module. As will be seen in detail later, the padding data 140 can be inserted between blocks of useful data by means of the multiplexer 120. Useful data and padding data are then written in the bi-FIFO buffer and read by the restoration module. An AEF (Almost Empty Flag) indicates the state of filling of the buffer. More precisely, when the buffer is almost empty, that is to say when the size of the stacking data stored is smaller than a predetermined threshold value, the AEF (Almost Empty Flag) is removed. A control device 100 controls the entire digital module. In particular, the control device can read or change the value of the AEF, change the state of the multiplexer 120, and control the writing of the useful or padding data in the buffer 110. In addition, the control device 100 orders the restoration module to carry out the radio frequency hopping.

The restoration module comprises an interpolating filter 160 in which the samples I and Q of the complex symbols are interpolated and a frequency converter 170 receiving two clocks in quadrature at the carrier frequency $f_0$ issuing from a DDS (Direct Digital Synthesiser) generator 150. The value of the carrier frequency $f_0$ is determined by the control device 100. The frequency converter 170 translates the frequency of the signal represented by the samples in base band to the carrier frequency. The digital signal thus obtained is then converted into an analogue signal by means of the digital to analogue converter 180. It should be noted that the interpolating filter 160, the frequency synthesiser 150 and the frequency converter 170 are digital circuits. In a variant embodiment, the functions of interpolation, frequency synthesis and frequency conversion can be the responsibility of a processor of the digital module, the restoration module then limiting itself to the digital to analogue conversion.

Figure 2:
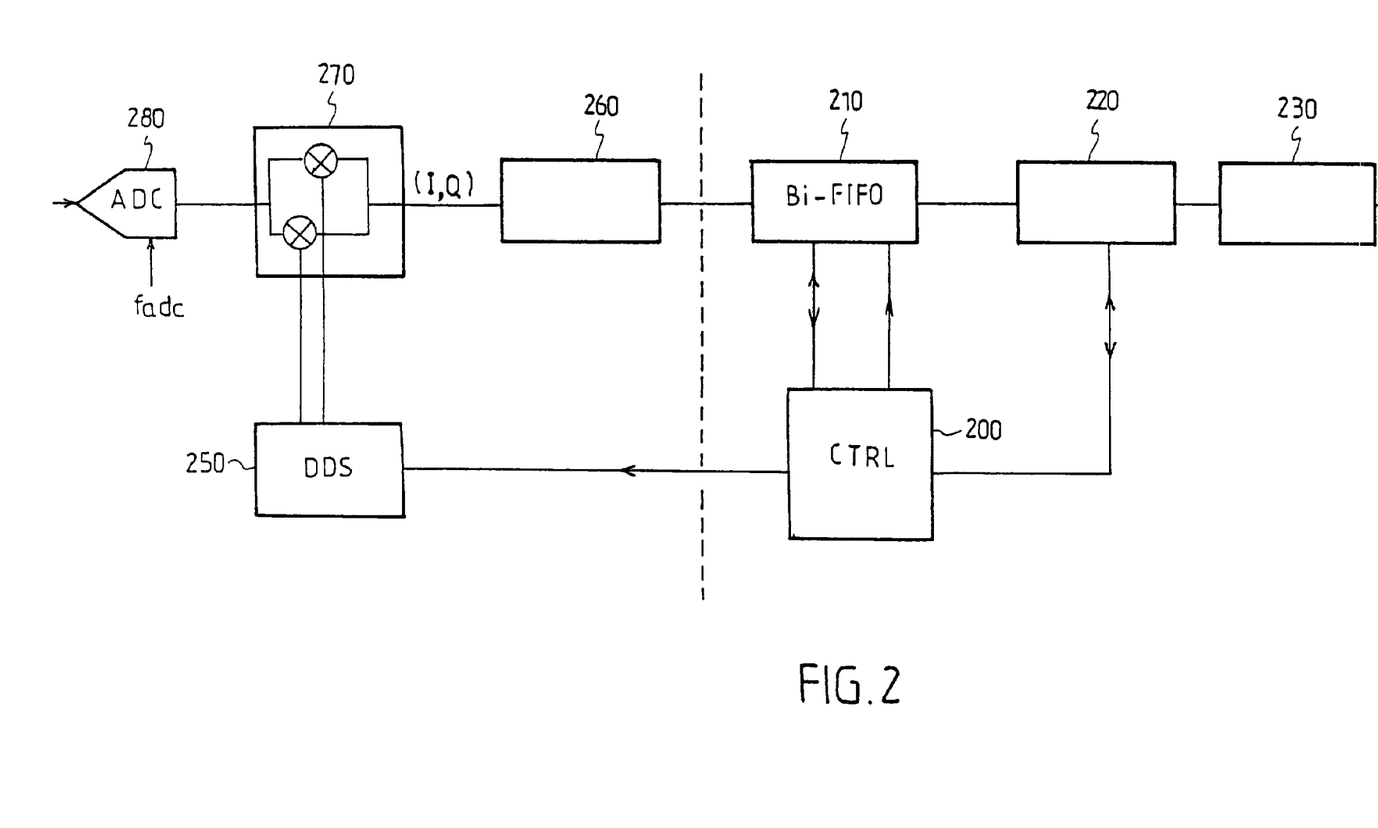
FIG. 2 depicts schematically a radio platform using a frequency hopping reception device according to one embodiment of the invention.

The system illustrated in FIG. 2 illustrates schematically the implementation of a frequency hopping receiver, for example a Bluetooth receiver, by means of a radio platform. This platform is divided into two independent modules, working asynchronously, as indicated by the broken line. The left-hand module, referred to as the acquisition module, provides the analogue to digital conversion and the frequency translation in base band. The right-hand module, referred to as the digital module, is responsible for the symbol to bit conversion, for example by means of a GFSK demodulator if a GFSK modulator was used on transmission. The digital module can also provide other functionalities known per se, such as block synchronisation, error detection and correction, etc.

The acquisition module comprises an analogue to digital converter 280, a frequency converter 270 effecting the conversion of the radio frequency signal issuing from the converter 280 into a base band signal. A frequency synthesiser 250 supplies to the frequency converter 270 two clocks in quadrature at the carrier frequency (radio frequency) $f_0$. The complex samples issuing from the frequency converter 270 are decimated in the decimator 260 before being written in the bi-FIFO buffer 210. The buffer then fills at the time of writing of data issuing from the acquisition module and empties when they are read by the digital module. An AFF (Almost Full Flag) indicates the state of filling of the buffer. More precisely, when the buffer is almost full, that is to say when the size of the stack of data stored is greater than a predetermined threshold value, the AFF is removed. A module 220 at the output of the buffer 210 is responsible for detecting the start of a block of useful data and eliminating the padding data. The useful data are then converted into bits by the demodulator 230, for example a GFSK demodulator. A control device 200 controls the entire digital module. In particular, the control device can read or change the value of the AFF, control the reading of data in the buffer 210, and instruct the module 220 to carry out a search for the start of a block of useful data. The control device 200 also determines the value of the carrier frequency generated by the synthesiser 250. It should be noted here too that the decimating filter 260, the frequency synthesiser 250 and the frequency converter 270 are digital circuits. In a variant embodiment, the functions of frequency translation, frequency synthesis and decimation can be dealt with by a processor of the digital module, the acquisition module then being limited to the analogue to digital conversion.

Returning now to the functioning of the radio platform of FIG. 1, the buffer is emptied by the restoration module according to the following cyclical process:

a data item is read from the buffer 110 and supplied to the interpolating filter 160;
if the buffer is almost empty, the AEF is set to 1;
the first step is returned to.

In a similar fashion, in the absence of frequency hopping, the buffer is filled according to the following cyclical process:

a block of useful data is generated by the modulator 130;
the control device 100 waits until the AEF is at 1;
when the AEF is at 1, the control device 100 enables writing of the block of useful data in the buffer 110;
the AEF is set to 0 and the first step is returned to.

The filling process and the emptying process are asynchronous and communicate simply by means of the AEF.

The general idea at the basis of the invention is to insert a block of padding data when a frequency hop must occur, so that these padding data are present in the frequency converter 170 when passing to and stabilizing at the new frequency. The process of emptying the buffer remains unchanged, but the filling process must be modified, as will be seen, in order to insert the padding data.

Figure 3A:
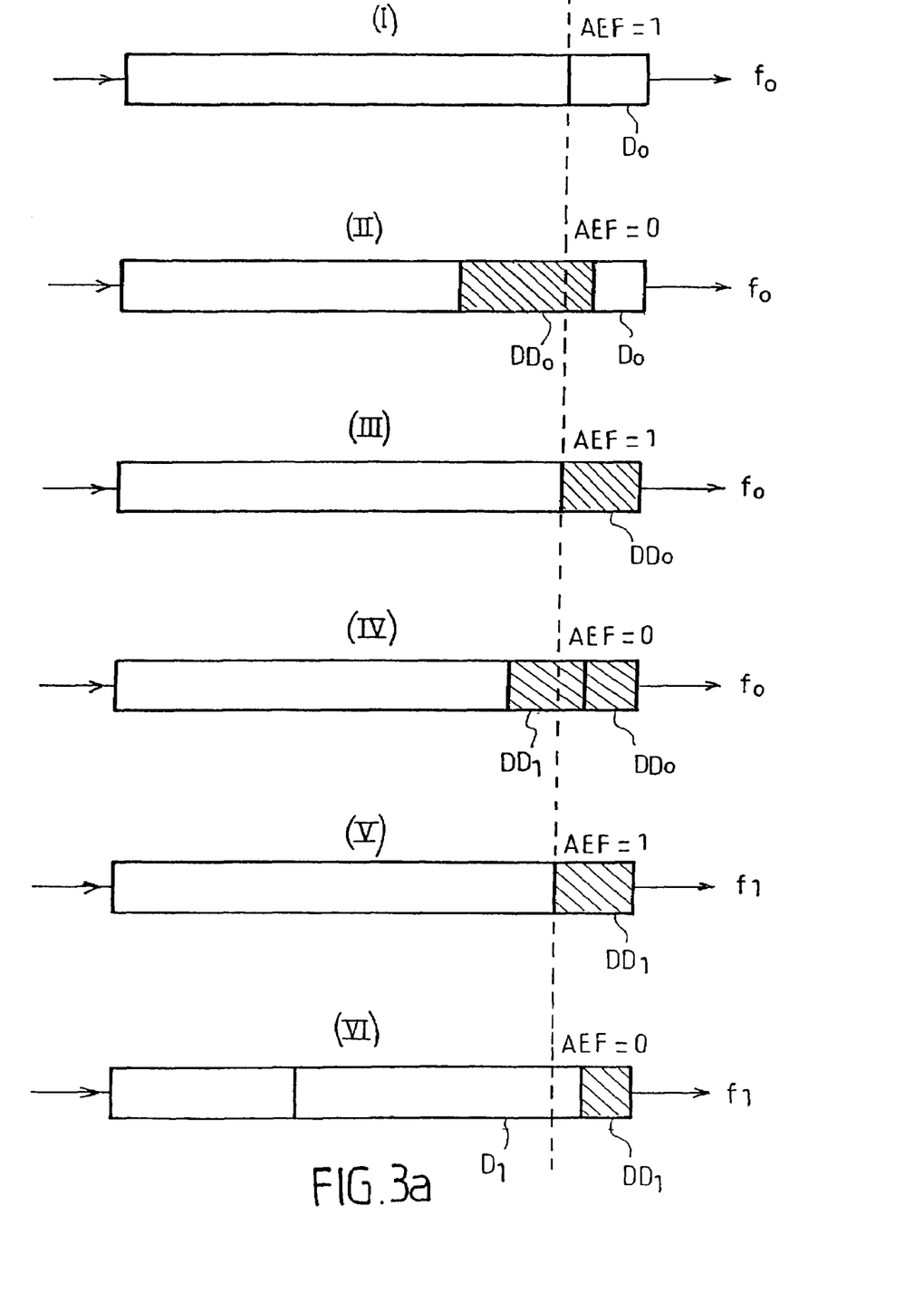
FIGS. 3a to 3d depict the state of the transmission buffer at different instants and according to different variant embodiments of the invention.

FIG. 3a illustrates a first variant embodiment of the invention. The content of the buffer 110 is depicted schematically therein at successive instants. Instant (I) corresponds to the time at which the AEF has just passed to 1. The end of a useful bloc $D_0$ is present in the buffer. The carrier frequency (radio frequency) chosen for transmitting the data of the block $D_0$ is $f_0$. If the transmitter has programmed a change in frequency for the following useful block, a first padding block $DD_0$ is first of all written in the buffer. To do this, the control device 100 controls the multiplexer 120 so as to select a padding block as from 140. Instant (II) corresponds to the time at which the first padding block has just been written in the buffer. The AEF is then set to 0 by the control device. The frequency cannot yet be modified since, given the delay through the interpolating filter 160, useful data of $D_0$ may still be present in the frequency converter 170. A little later, at (III), the buffer is once again almost empty and the AEF is once again removed. The control device 100 then controls the writing of a second padding block $DD_1$, as can be seen at (IV), and then instructs the frequency synthesiser 150 to modify the carrier frequency to the value $f_1$. The AEF is once again set to 0. When at (V) the buffer is once again almost empty, it is certain that the synthesiser has stabilized at the frequency $f_1$ and it is then possible to write (VI) the useful block intended to be transmitted at this frequency.

Figure 3B:
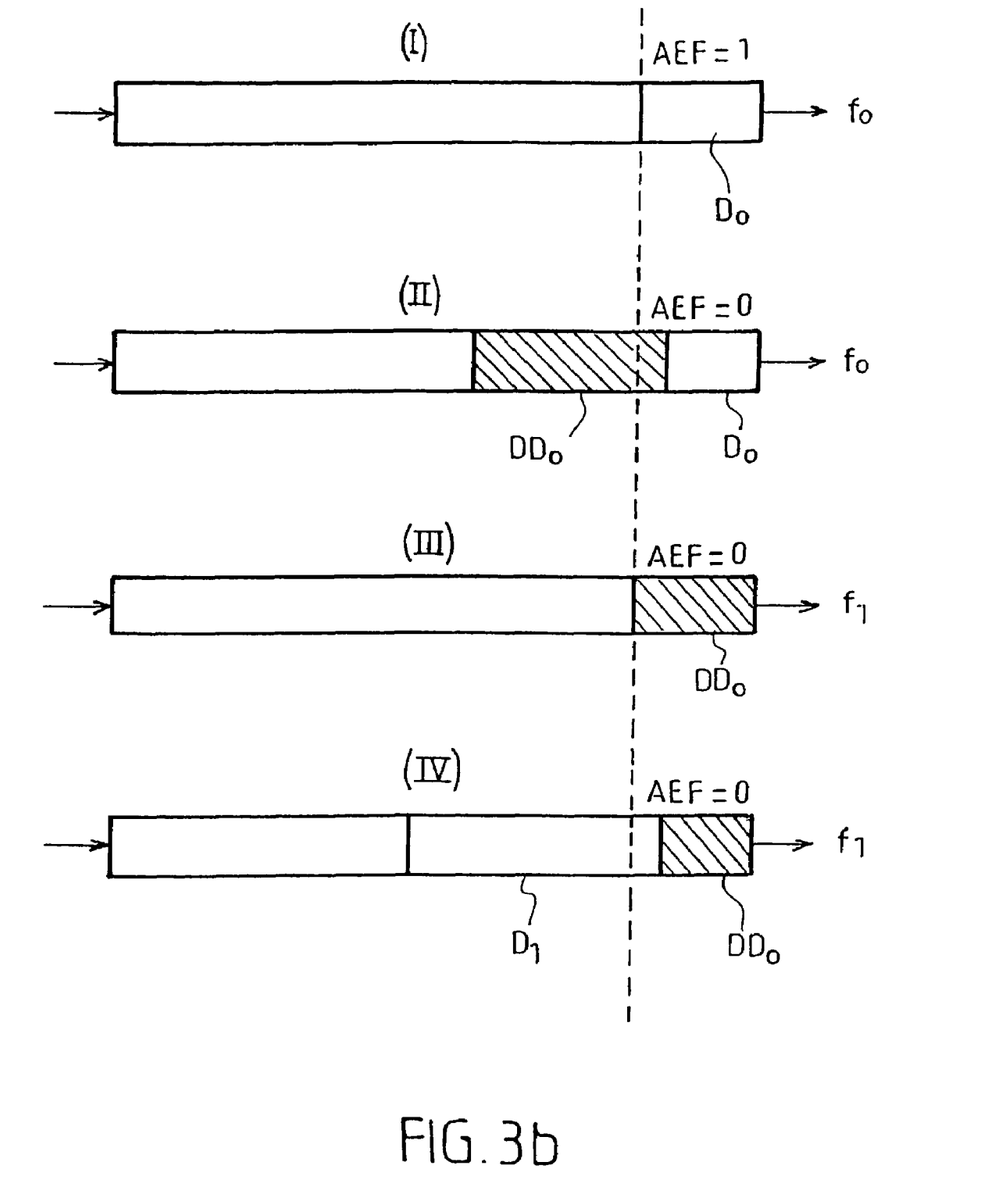

FIG. 3b illustrates a second variant of the invention. Instant (I) corresponds to the time when the AEF has just passed 1. The end of a useful block $D_0$ is present in the buffer. The carrier frequency chosen for modulating the data of the block $D_0$ is $f_0$. If the transmitter has programmed a change in frequency for the following useful block, a padding block $DD_0$ is then first of all written (II) in the buffer. The AEF is set to 0.

It should be noted that, here, the threshold of triggering of an almost empty buffer must be sufficiently high and the size of the padding block chosen sufficiently great so that, on the one hand, when the buffer becomes almost empty again (III) padding data are already in the frequency converter 170 and so that, on the other hand, the frequency synthesiser has had the time to stabilize whilst the padding data are still in the frequency converter. At instant (III) the frequency of the synthesiser is modified to the value $f_1$ and the useful block to transmit at this new frequency is written in the buffer (IV).

Figure 3C:
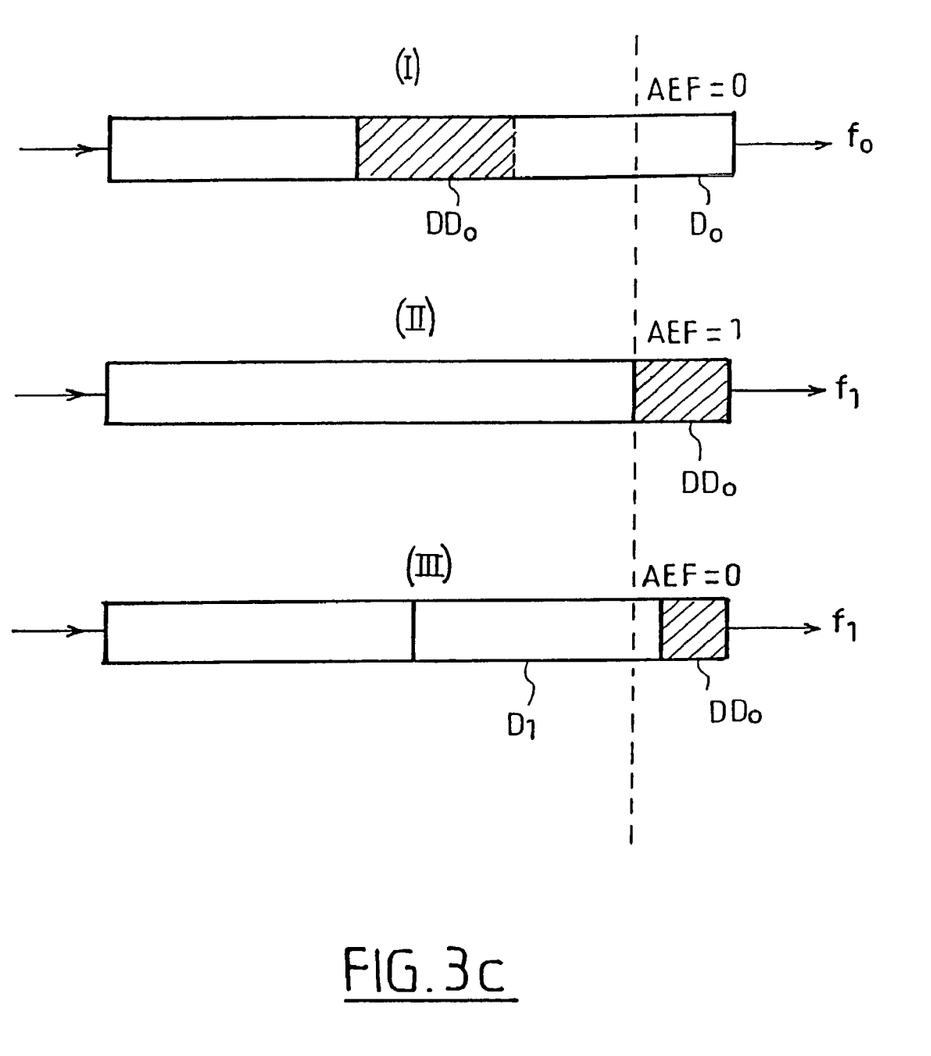

FIG. 3c illustrates a third variant embodiment of the invention. This variant differs from the previous one in that a data block of variable length is enabled: the padding block is then concatenated as a suffix to the last block to be transmitted at the frequency $f_0$. Here also, the length of the suffix and the threshold of triggering of an almost empty buffer must be sufficiently high for the padding data to be in the frequency converter during the transition from $f_0$ to $f_1$. Instant (I) shows the reading of the last useful block at the frequency $f_0$. At instant (II), the buffer is almost empty and the padding data have already reached the frequency converter: the frequency is then modified to the value $f_1$. The new useful block to be transmitted at this frequency is written (III) in the buffer. The concatenation of the suffix is controlled by the control device 100, by actuating the multiplexer 120, so as to permit the writing of a padding suffix following the useful data.

Figure 3D:
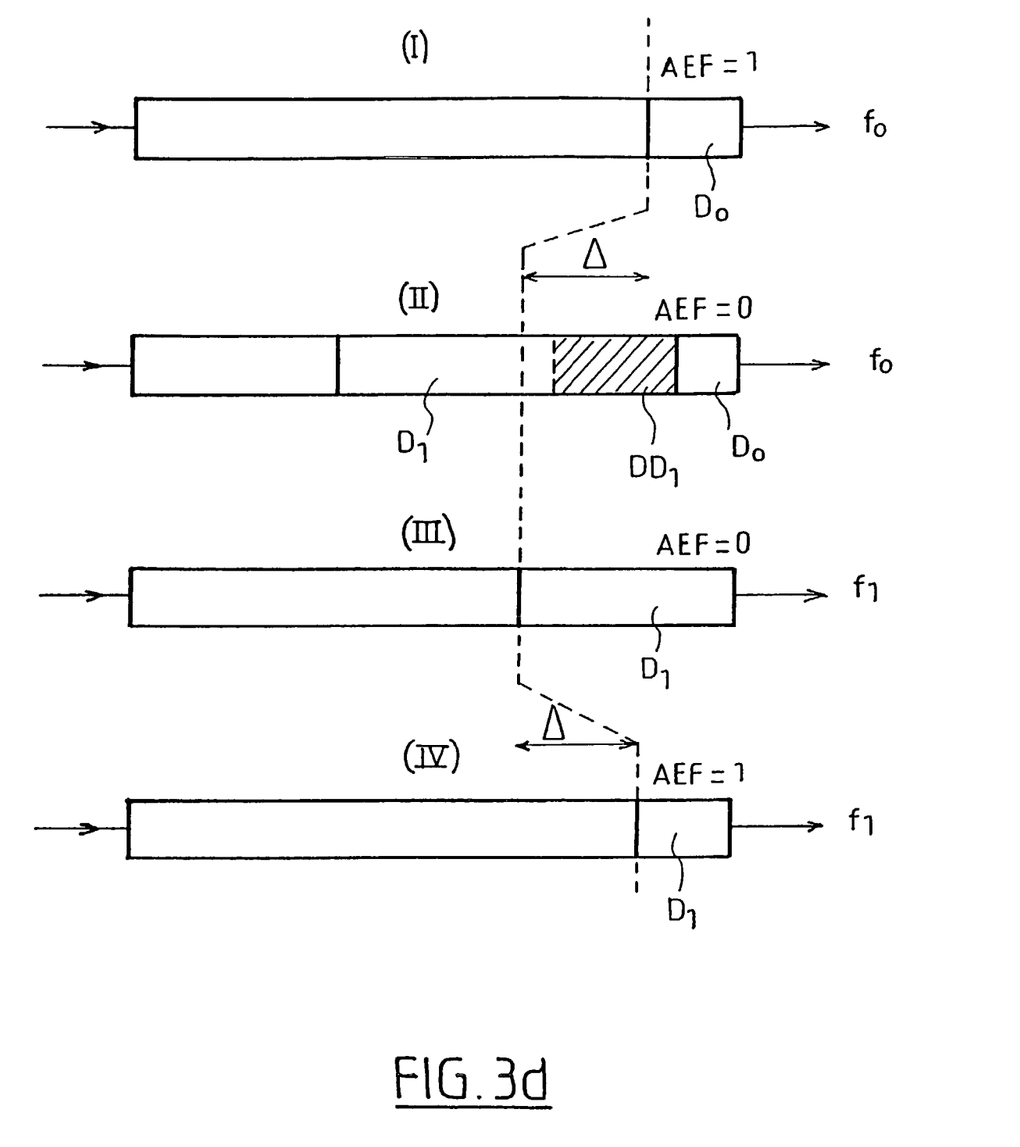

FIG. 3d shows a fourth variant embodiment of the invention. This variant assumes again that the system enables the processing of blocks of variable length. It nevertheless differs from the previous one in that the padding data are no longer concatenated as a suffix to the last block to be transmitted at the frequency $f_0$, but as a prefix to the first block to be transmitted at the new frequency $f_1$. Instant (I) corresponds to the time at which the AEF has just passed to 1. The end of a useful block $D_0$ to be modulated at the frequency $f_0$ is present in the buffer. If the transmitter has programmed a change in frequency for the following useful block, the control device 100 controls, by means of the multiplexer 120, the writing of a prefix consisting of padding data, followed by the data of this useful block, and then increases the threshold of triggering of the almost empty buffer to a value $+\Delta$ and sets AEF to 0. When the buffer is once again almost empty (III), the control device 100 modifies the frequency to the value $f_1$ and then re-establishes the threshold of triggering of the almost empty buffer to its initial value. When the buffer is almost empty (IV) with respect to the new threshold value, the control device controls the writing of a new useful block in the buffer. The value $\Delta$ and the size of the prefix must be chosen sufficiently high so that, on the one hand, when the buffer becomes almost empty with respect to the increased threshold value, the padding data have already reached the frequency converter and, on the other hand, when the buffer becomes almost empty again with respect to the initial threshold value, padding data are still in the frequency converter.

If the radio platform of FIG. 2 configured as a receiver is considered, the acquisition module fills the buffer 210 according to the following cyclical process:

the values I and Q of a complex sample issuing from the decimator are written in the buffer;
if the buffer is almost full AFF is set to 1;
the first step is returned to.

Figure 4:
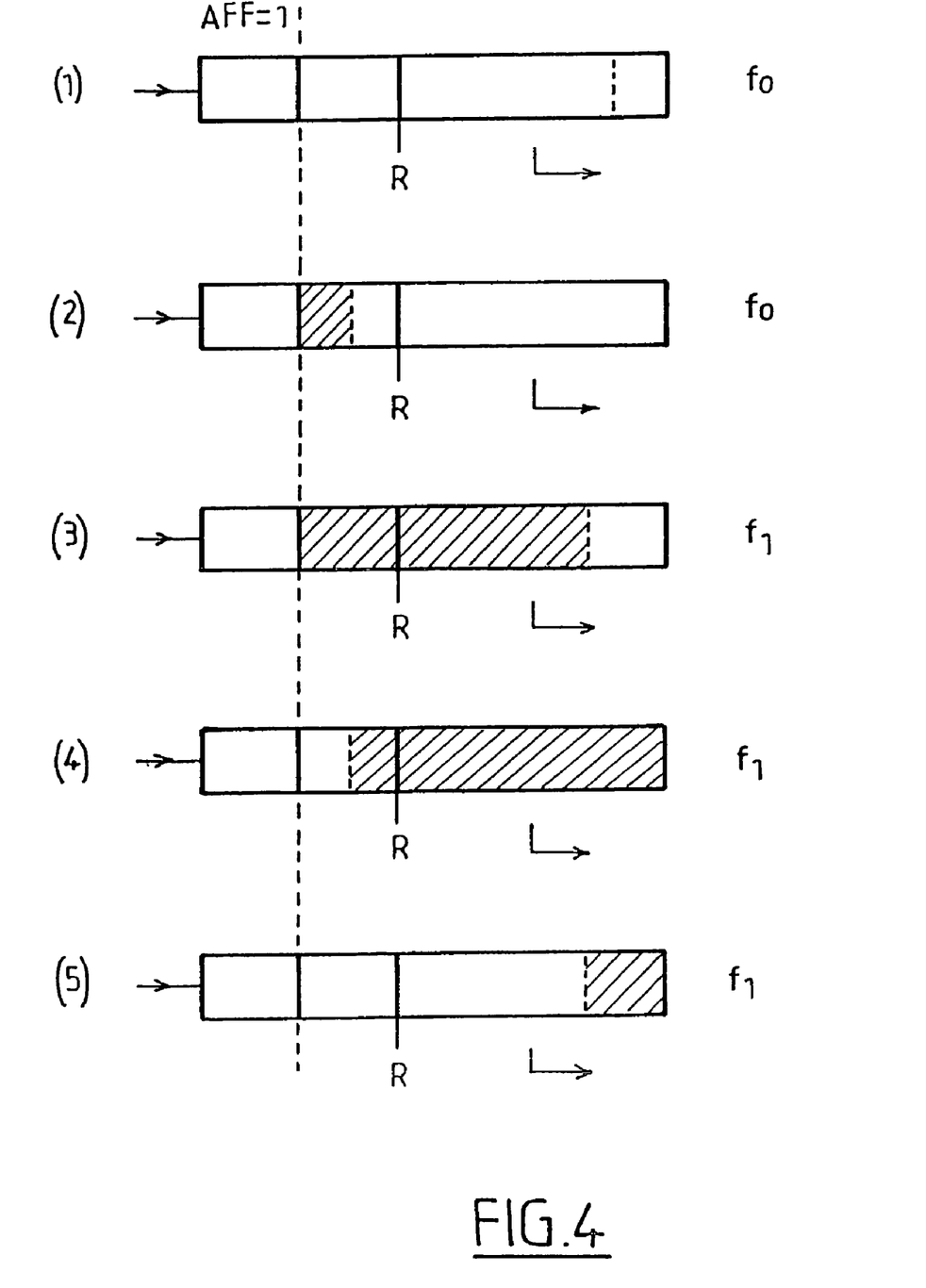
FIG. 4 depicts different possible states of the reception buffer.

FIG. 4 shows possible contents of the buffer when AFF has just passed to 1. The limit corresponding to the almost full buffer threshold has been shown in broken lines. The dotted lines within the buffer symbolize the separations between blocks or between a block and a prefix/suffix, as present at transmission. The part of the buffer to the right of the solid line (denoted R), which will be referred to as the reading window, is read by the digital module when AFF=1.

The size of the reading window is chosen so that it can contain only one transition between useful data and padding data. To do this, a window size is chosen less than the length of a padding sequence. The latter will be equal to the sum of the lengths of the blocks $DD_0$ and $DD_1$ in the case of FIG. 3a, the length of the block $DD_0$ in the case of FIG. 3b, the length of the suffix in FIG. 3c and the length of the prefix in FIG. 3d. It will be assumed hereinafter that the padding sequence length is less than the useful block length. Situations (1) to (5) correspond, within the reading window, respectively to:
- a transition between useful blocks;
- no transition is observed, all the data in the window are useful;
- a transition between useful data and padding data, for example between useful block and padding block or between useful data and padding suffix;
- padding data alone (block or suffix/padding prefix);
- a transition between padding data and useful data, for example between padding block and useful block or padding prefix and useful data.

Figure 5:
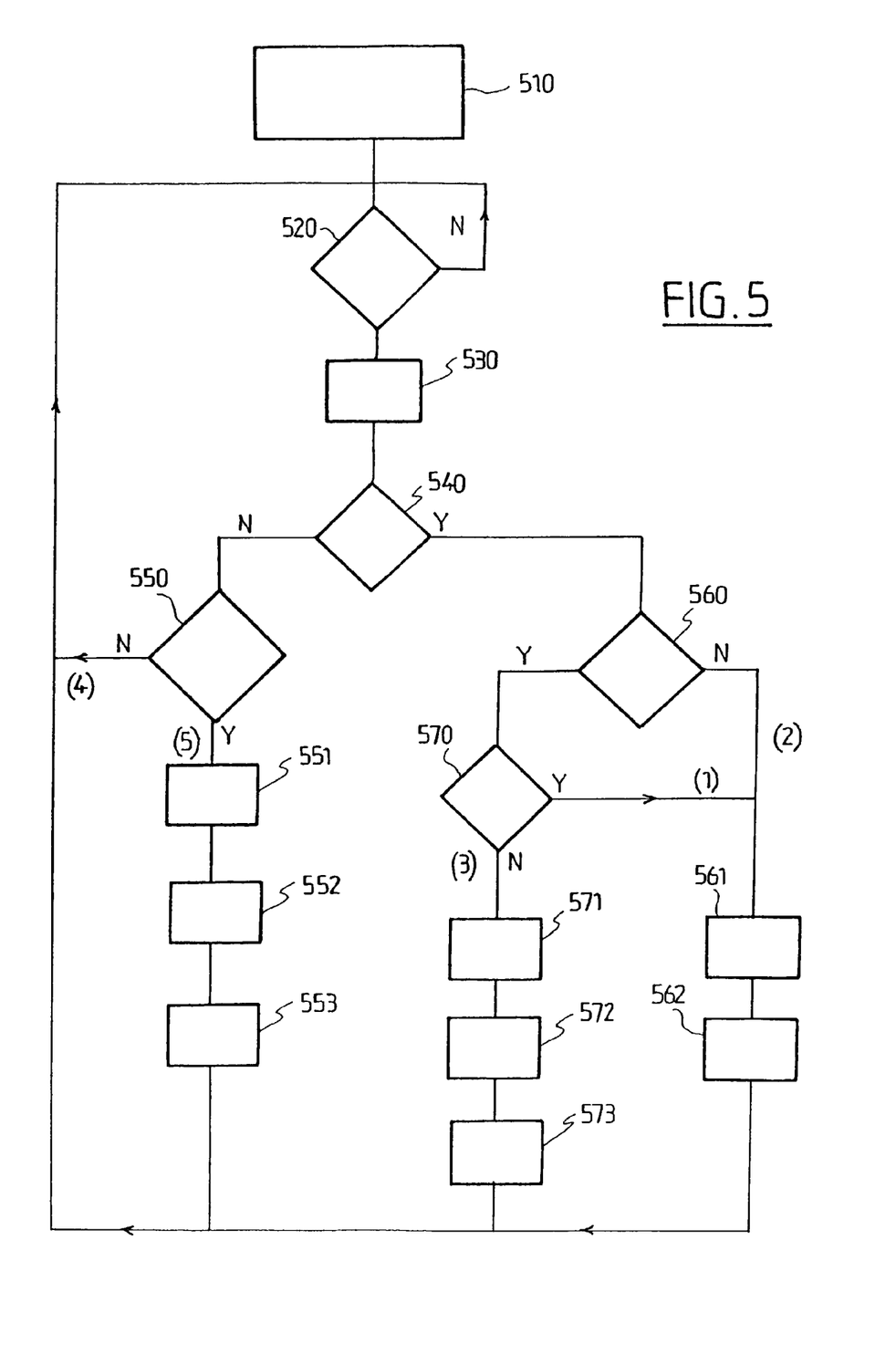
FIG. 5 depicts a flow diagram of the reception method according to an embodiment of the invention.

FIG. 5 depicts the flow diagram of the method of emptying the buffer 210 and recovering the useful data. It will be assumed that each useful block begins with a particular sequence which is easily detectable (for example by means of a correlation) making it possible to differentiate it from a padding block.

Step 510 represents the initialization of the method: the remaining useful block length, r, is initialized to L, the useful block length. A test loop on the value of the AFF is then effected at 520. As soon as AFF=1 (buffer almost filled), the data contained in the reading window are read at 530 and the AFF is set to 0. A test is carried out at 540 to determine whether a useful block was currently being received: to do this, the remaining useful block length, r, is compared with the useful block length L. If r<L, this means that the remainder of a useful block is awaited, otherwise (r=L) a new useful block is awaited.

If r=L, a test is carried out at 550 to determine whether the module 220 has detected the start of a useful block. In the negative, case (4) of FIG. 4 applies and the AFF test loop is returned to. On the other hand, in the affirmative, case (5) of FIG. 4 applies and the control device 200 instructs (at 551) the module 220 to search for the first useful data item. A pointer to this first data item is determined. The useful data are processed at 552 from the value of the pointer. The remaining length r is updated at 553. Finally the AFF test loop is returned to.

If r<L, a test is carried out at 560 to determine whether r<R where R is the size of the reading window. In the negative, case (2) of FIG. 4 applies: all the data are consequently useful and are processed at 561. The value of r is then updated at 562. On the other hand, when r<R, a test is carried out at 570 to determine whether the module 220 has detected the start of a useful block:
- in the affirmative, situation (1) in FIG. 4 applies. All the data read are useful and the step 561 of processing the data read is passed to, and then to the updating of r at 562. Finally, the AFF test loop is returned to;
- in the negative, situation (3) of FIG. 4 applies. The control device 200 instructs, at 571, the synthesiser 250 to modify its frequency. The frequency modification occurs whilst the padding data are still present in the frequency converter 270. The r remaining useful data are processed at 572 and the value r is reinitialised to L at 573. Lastly, the AFF test loop is returned to.

It will be noted that this method requires a search for the start of the useful block only after a change in frequency since the system continuously follows the remaining useful block length value r. If no useful block transition is detected whilst r is less than the width R of the reading window, a frequency hop must be made.

The invention claimed is:

1. A method of transmitting data in the form of a series of blocks, each block of data being subjected to a frequency conversion in order to be transmitted at a carrier frequency, comprising:
   inserting a sequence of padding data between a first block of data intended to be transmitted at a first carrier frequency and a second block of data intended to be transmitted at a second carrier frequency; and
   transmitting the padding data while the frequency changes from the first carrier frequency to the second carrier frequency.

2. The method according to claim 1, further comprising:
   inserting the padding data in the form of a padding block between the said first and second blocks.

3. The method according to claim 1, further comprising:
   concatenating the padding data are as a suffix with the first padding block.

4. The method according to claim 1, further comprising:
   concatenating the padding data as a prefix with the second padding block.

5. The method according to claim 1, further comprising:
   writing in a FIFO buffer;
   reading the FIFO buffer asynchronously with the writing.

6. The method according to claim 5, further comprising:
   writing a block of data when a flag indicates that the buffer is almost empty;
   changing the value of the flag; and
   recommencing writing data.

7. The method according to claim 6, further comprising:
   reading a data item from the buffer;
   removing said flag if the buffer is almost empty; and
   recommencing reading data.

8. The method according to claims 2 or 6, further comprising:
   writing a block of padding data in the buffer if the following block is to be transmitted at a carrier frequency different from the current carrier frequency.

9. The method according to claims 3 or 6, further comprising:
   concatenating a padding suffix with the block preceding the first block to be transmitted at a carrier frequency different from the current carrier frequency; and
   writing the block with the padding suffix in the buffer.

10. The method according to claims 4 or 6, further comprising:
    concatenating a padding prefix with a block of data if the block of data is to be transmitted at a carrier frequency different from the current carrier frequency.

11. A transmission device adapted to transmit data in the form of a series of blocks, comprising:
    an insertion device configured to insert a sequence of padding data between a first block of data intended to be transmitted at a first carrier frequency and a second block of data intended to be transmitted at a second carrier frequency; and
    a transmitter configured to transmit the padding data while the frequency changes from the first carrier frequency to the second carrier frequency.

12. The transmission device according to claim 11, further comprising:
- a FIFO buffer configured to receive blocks of data to be transmitted;
- a frequency converter configured to transpose the data read from the said buffer to a carrier frequency;
- a frequency synthesizer configured to supply a clock at the carrier frequency to the converter;
- an insertion device configured to insert padding data,
- a control device configured to instruct the said insertion device to insert padding data between two blocks of data to be transmitted and to instruct the frequency synthesizer to effect a change in carrier frequency.

13. A method of receiving data transmitted by a transmission device with frequency hopping in the form of a series of blocks, each block having been transmitted at a carrier frequency being converted into baseband by means of a frequency conversion, the method comprising:
- receiving a sequence of padding data while the frequency conversion passes from a first carrier frequency to a second carrier frequency; and
- separating a first block of useful data, transmitted at the first carrier frequency, from a second block of useful data, transmitted at the second carrier frequency, by the sequence of padding data.

14. The method according to claim 13, further comprising:
- detecting a transition between useful data and padding data; and
- changing the frequency from the first carrier frequency to the second carrier frequency when the transition is detected.

15. The method according to claim 14, further comprising:
- writing in a FIFO; and
- reading from the FIFO buffer asynchronously with the writing.

16. The method according to claim 15, further comprising:
- removing a flag when the buffer is almost full; and
- recommencing the reading.

17. The method according to claim 16, further comprising:
- reading a block of data when the said flag indicates that the buffer is almost full;
- changing the value of the flag; and
- recommencing the reading.

18. The method according to one of claims 14 to 17, further comprising:
- determining the start of the second useful block after having detected a transition between useful data and padding data; and
- updating, at each following reading, the length of the current useful block remaining to be read.

19. A reception device adapted to receive data transmitted by a transmission device with frequency hopping in the form of blocks of useful data, interspersed or not with sequences of padding data, comprising:
- a separating device configured to separate a first block of useful data, transmitted at a first carrier frequency, from a second block of useful data, transmitted at a second carrier frequency, by a sequence of padding data; and
- a receiver configured to receive the sequence of padding data while the frequency conversion passes from the first carrier frequency to the second carrier frequency.

20. The reception device according to claim 19, further comprising:
- a FIFO buffer configured to receive the data;
- a frequency converter configured to operate at a working frequency and to convert the data read from the said buffer into a signal in base band,
- a frequency synthesizer configured to supply to the said frequency converter a signal at the said working frequency;
- a detector configured to detect a transition between useful data and padding data; and
- a control device configured to instruct the said frequency synthesizer to effect a change in the working frequency when the transition is detected.

* * * * *